J. BURKE.
MEANS FOR CONTROLLING SYNCHRONOUS MACHINES.
APPLICATION FILED SEPT. 20, 1907.

1,073,662.  Patented Sept. 23, 1913.
2 SHEETS—SHEET 1.

J. BURKE.
MEANS FOR CONTROLLING SYNCHRONOUS MACHINES.
APPLICATION FILED SEPT. 20, 1907.

1,073,662.

Patented Sept. 23, 1913.

2 SHEETS—SHEET 2.

Witnesses
Geo. A. Hoffman.
Geo. N. Kerr.

James Burke  Inventor
By his Attorneys
Edwards, Sager + Wooster.

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

MEANS FOR CONTROLLING SYNCHRONOUS MACHINES.

1,073,662.  Specification of Letters Patent.  Patented Sept. 23, 1913.

Application filed September 20, 1907. Serial No. 393,785.

*To all whom it may concern:*

Be it known that I, JAMES BURKE, a citizen of the United States, residing at Erie, in the county of Erie and State of Pennsylvania, have invented certain new and useful Improvements in Means for Controlling Synchronous Machines, of which the following is a full, clear, and exact specification.

My invention relates to alternating current apparatus and particularly to a method and means for controlling synchronous machines and the starting of such machines.

One object of my invention is the securing of efficient means for starting a synchronous motor and bringing the latter into synchronous speed, with a view particularly to secure safe and reliable operation and economical starting. The throwing of synchronous apparatus into synchronous operation has been a matter of great difficulty, and not only has required a reliable operating engineer but even then the disastrous results from an improper operation with resulting damage to the machines, has not been overcome, and with operators who are not reliable and who have not been well trained in the particular mode of operation, the placing into synchronism of large machines is so important that with former methods such operators cannot be given the responsibility.

A further object of my invention relates to the maintaining of the machine in synchronism after being started and thus secure greater reliability in normal operation.

My invention will be understood from the following description and accompanying drawings, in which—

Figure 1:
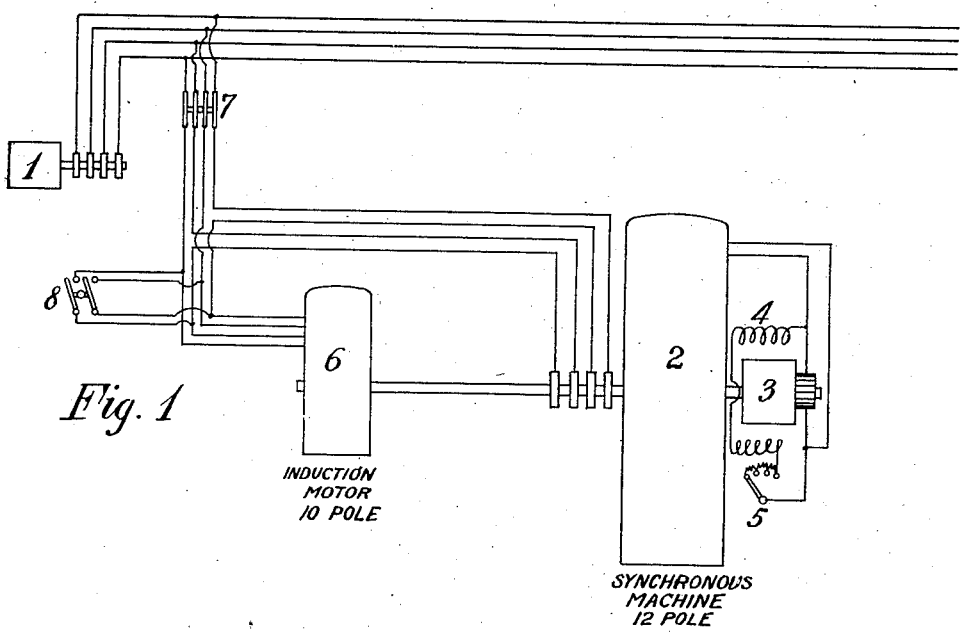
Figure 2:
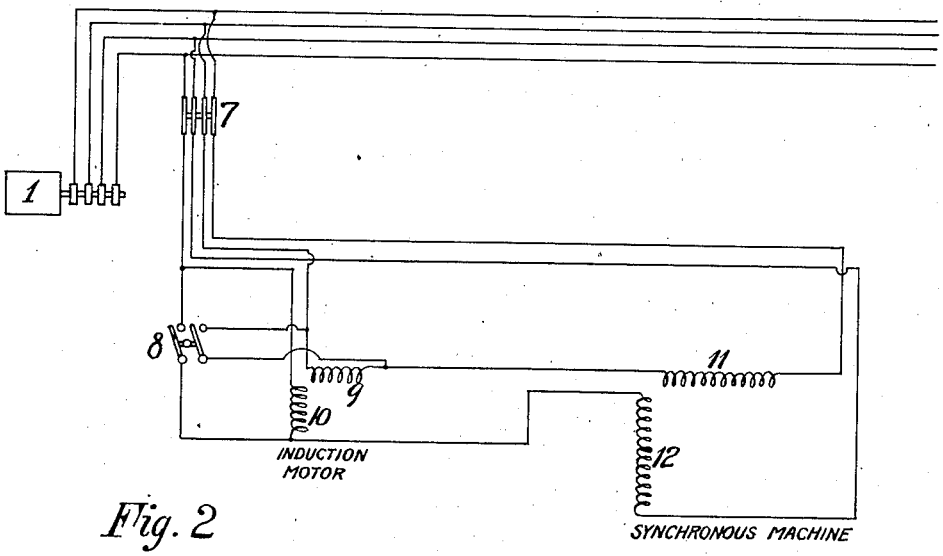

Figure 1 is a diagram showing one embodiment of my invention, and Fig. 2 is a diagram showing the electrical connections of the apparatus of Fig. 1, and Figs. 3, 4 and 5 are diagrams illustrating additional embodiments of my invention.

The source of electric energy is indicated at 1, and in this particular instance is indicated as a two-phase generator supplying a two-phase system. The synchronous machine which is to be started and controlled, is indicated at 2, and this may be a motor performing mechanical work, or may be in the form of a rotary converter. On the shaft of the synchronous machine, is indicated an exciter 3 for supplying current to the field windings of the synchronous machines, and which exciter is shown in the drawing as having a shunt field winding 4. A field regulator 5 is provided in series with the winding 4 for adjusting the field excitation of the exciter and synchronous machine to proper amounts. Although the exciter is shown as a shunt wound machine, it will be understood that a series or a compound wound machine may be used and the excitation may sometimes be obtained in other ways and without necessarily mounting the exciter on the main shaft. Also on the shaft of the synchronous motor is indicated an induction motor 6, but it will be understood that this motor may be mechanically connected to the synchronous machine in any other desirable manner, and a motor other than an induction motor may sometimes be used. For purpose of explanation, I have assumed that the synchronous machine will have twelve poles and the induction motor ten poles. A main switch 7 is shown between the supply mains and the apparatus to be operated and a switch 8 is provided for short circuiting the windings of the motor 6 if desired.

In Fig. 2, the two-phase windings 9, 10, of the induction motor are diagrammatically indicated, and the two-phase windings 11, 12, of the synchronous motor, are similarly indicated. By following the connections, it will be seen that one winding 9 of the induction motor is connected in series with the corresponding winding 11 of the synchronous motor between two of the supply mains of one phase. Also the remaining winding 10 of the induction motor is connected in series with the corresponding winding 12 of the synchronous motor between the remaining two supply mains.

When it is desired to start the synchronous motor, it is merely necessary to complete the circuits to the induction motor and synchronous motor, such as by closing switch 7 or by completing the circuits with any other desirable form of controlling device or devices. The synchronous motor being at rest and of course out of synchronism, will not produce any appreciable effective counter-electromotive force, and the windings of the induction motor will, therefore, be subjected to a comparatively high applied electromotive force. This will cause the induction motor to start, which in turn will start the synchronous machine. The speed of the induction motor will gradually increase, and considering the action of it alone would tend to reach its synchronous speed, which in the instance of 10 poles in the induction motor would, at a frequency of 60 cycles, approach 12 revolutions per second, that is, 720 revolutions per minute, being below that however by the amount of its slip. When in conjunction with the synchronous machine, which in this illustration has 12 poles and therefore at 60 cycles a synchronous speed of 10 revolutions per second, that is, 600 revolutions per minute, at the instant the induction motor attains 10 revolutions per second, the synchronous machine comes into synchronism with the circuit and the counter-electromotive force of the synchronous motor assumes a value commensurable with the line voltage. This results in the electromotive force on the induction motor dropping to a small and unimportant value, the line voltage now being required to overcome the counter electromotive force of the synchronous motor, the field excitation of the synchronous motor having been built up with the gradual increase in speed. If the synchronous machine should momentarily drop in speed, such as by reason of the sudden application of load or from any other cause, the induction motor will then become active and exert a strong torque tending to bring the machine into proper operation. Consequently, the induction motor not only serves to start and bring the synchronous motor into synchronism, but also serves during normal operation to oppose any tendency of the synchronous machine to fall from synchronism. After attaining synchronism, however, it will sometimes be desirable to cut out the induction motor and thereby economize in the consumption of energy during normal operation. Also the design of the induction motor may be such that although of sufficient capacity to start the synchronous motor, it may not be designed to carry continuously the large current supplied to the synchronous machine when under heavy load. I have therefore indicated a switch 8 for short circuiting the windings of the induction motor if desired after synchronism is attained. At this time, as above explained, no appreciable electromotive force will be applied to the induction motor windings and the latter may therefore be short circuited without harmful effects. No energy will then be consumed by the windings and the rotating element of the induction motor will then rotate idly.

It will be seen that by my invention no particular skill on the part of the operator is required in starting the apparatus, nor is it necessary to have any auxiliary devices for indicating to the operator when certain steps are to be taken. It is simply necessary to close the circuits originally and the machines then coöperate to increase in speed and attain synchronous speed automatically. It will also be seen that my invention secures absolute reliability and avoids damage to the apparatus or installation which might result in other cases by improper manipulation of the apparatus by the operator, and other advantages will be understood by those skilled in the art.

Figure 3:
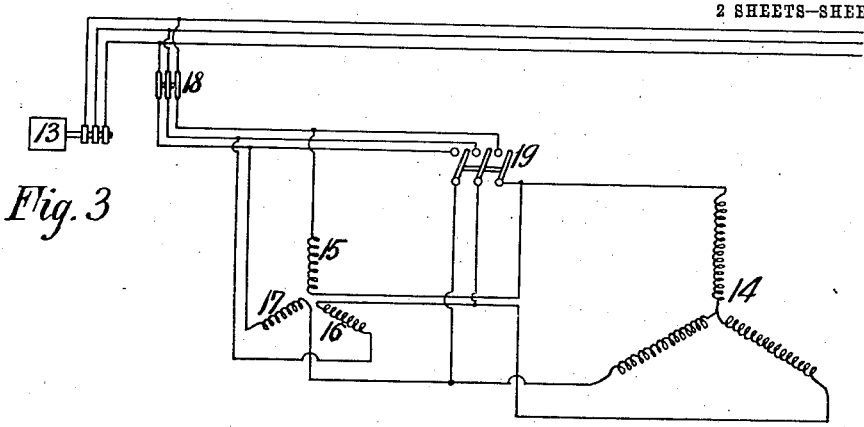

Although I have indicated a two-phase system in Figs. 1 and 2, it will be understood that any suitable number of phases may be employed and connected in various ways. In Fig. 3, I have indicated my invention embodied in a three-phase system, a three-phase source of electrical energy being indicated at 13. The three-phase windings of the synchronous motor are shown at 14 connected in star, and the three-phase windings of the induction motor are indicated at 15, 16 and 17. A main switch is shown at 18, and the switch 19 is adapted to short circuit the induction motor windings during normal operation if desired. It will be seen that a connection from one of the three-phase supply mains extends to the winding 15 and thence to a terminal of one of the star connected windings of the synchronous machine. Another connection extends from the intermediate supply main to the winding 16, and thence to a terminal of a second star connected winding of the synchronous machine. Another connection extends from the remaining supply main through induction motor winding 17, and thence to its corresponding winding of the synchronous machine. During starting, the three-phase windings of the induction motor are therefore connected in series with corresponding three-phase windings of the synchronous machine, and the action in starting will be the same substantially as described with reference to Figs. 1 and 2, it being understood that the field of the synchronous machine will be energized as already described. After synchronous speed is attained, switch 19 may be closed and thereby short circuit the induction motor windings.

Figure 4:
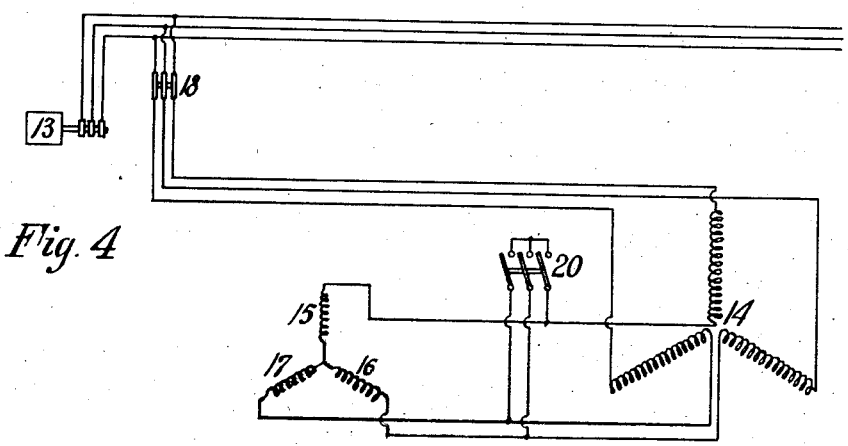

In Fig. 4, the parts similarly numbered correspond to those of Fig. 3, but the windings are differently connected. In Fig. 4, the upper supply main is connected to a terminal of one of the windings 14 and thence to a terminal of winding 15 of the induction motor, which latter winding is connected in star with the remaining induction motor windings 16, 17. Connection from the intermediate supply main extends to another winding 14 and thence to a terminal of corresponding winding 16 of the induction motor. Connection from the remaining supply main extends to the remaining winding 14 and thence to a terminal of winding 17. It will be seen that in Fig. 3, the current from the supply mains in starting will pass first through the induction motor windings to the star connected windings of the synchronous machine, whereas in Fig. 4, the current from the supply mains first passes through the windings of the synchronous machine and then to the star connected windings of the induction motor. For normal operation, the switch 20 in Fig. 4, may be closed thereby short circuiting the induction motor windings and resulting in a star connection of the synchronous motor windings.

Figure 5:
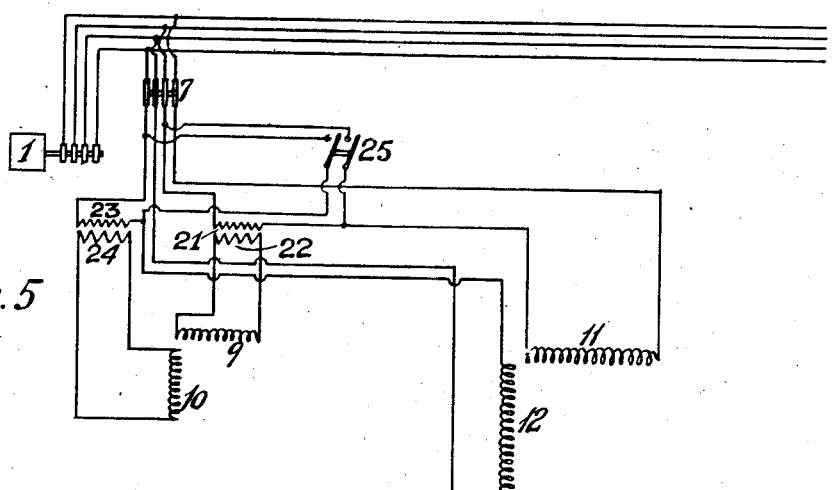

Although, in the preceding figures, the windings of the induction motor and synchronous motor are shown connected directly to the supply mains, it will sometimes be advisable to introduce transformers between the supply mains and either the synchronous motor or the induction motor or between both, and for the purpose of explanation I have shown in Fig. 5, transformer windings introduced between the supply mains and induction motor windings. This condition will probably arise in practice more frequently than others, as, for economy in normal operation, the synchronous motor will be wound to withstand high voltages, whereas the induction motor may be wound for comparatively low voltages. I have selected for illustration a two-phase system, and parts indicated by the same reference numerals as in Figs. 1 and 2, represent the same apparatus. It will be understood, however, that the transforming devices may be introduced in systems of other phase and in various forms of connection. In series with the winding 11 of the synchronous machine is connected the primary 21 of a transformer, the secondary 22 thereof being connected in series with the winding 9 of the induction motor. In series with the winding 12 across the two mains of the remaining phase is connected the primary winding 23 of the transformer, the secondary 24 being connected in series with the induction motor winding 10. A switch 25 is shown for short circuiting the primary windings 21 and 23 after synchronism is attained and for the purpose of rendering the transformer windings and induction motor windings inactive if desired. In starting with the apparatus of Fig. 5, practically the full electromotive force of the supply mains will be applied to the primary windings 21, 23, and cause the secondary windings 22, 24 to supply current to the induction motor for starting. When synchronism is attained the electromotive force applied to the primary windings 21, 23 will not be appreciable on account of the counter-electromotive force of the synchronous motor becoming effective, and so causing substantially the full electromotive force to be applied to the synchronous motor windings. The switch 25 may then be safely closed if desired, as already referred to.

I have illustrated the preceding forms with a view to explaining the application of my invention in various ways, and it will be understood that various other forms and arrangements of connections may be utilized without departing from the scope of my invention. When transformers are introduced they may be variously applied and grouped and connected in any of the well known ways, and apparatus of different phase may sometimes be combined in one system. Also, instead of providing the induction motor with a less number of poles than the synchronous machine, any desirable means may be utilized for obtaining the desired speed relation, in each case the number of poles, or sets of poles, of the induction motor being less than the number of poles, or sets of poles, of the synchronous machine divided by the ratio of the angular speeds.

Having thus described my invention, I declare that what I claim as new and desire to secure by Letters Patent, is,—

1. The combination with a source of polyphase current, of a polyphase synchronous machine, a starting polyphase motor, means for mechanically connecting the movable element of said motor to the movable element of said machine to drive the same at a predetermined angular speed ratio, the number of poles of said motor being less than the number of poles of said machine divided by the said speed ratio, and means for connecting the polyphase windings of said machine respectively in series with the corresponding polyphase windings of said motor between the terminals of said source.

2. The combination of a polyphase synchronous machine, a polyphase induction motor, means for mechanically connecting the movable element of said motor to the movable element of said machine to drive the latter at a certain angular speed ratio, the number of poles of said induction motor being less than the number of poles of said synchronous machine divided by the angular speed ratio, and means including a source of polyphase alternating current for energizing the polyphase windings of said machine respectively in series with the corresponding polyphase windings of said induction motor.

3. The combination, of a polyphase synchronous machine connected thereto, a self-starting polyphase motor having its movable element mechanically connected to the movable element of said machine to drive the latter at the same speed, and means for energizing the polyphase windings of said machine respectively in series with the corresponding polyphase windings of said motor between the terminals of said source, the sets of poles of said motor being less than the sets of poles of said machine but greater than one half of the same, whereby said motor at or near its maximum speed causes said synchronous machine to be driven at a speed at which the counter-electromotive force of the synchronous machine becomes effective against the line voltage and the machine is automatically brought into synchronism.

4. The combination of a source of alternating current, an alternating synchronous machine, an induction motor, means for mechanically driving the movable element of said machine by the movable element of said motor at a predetermined angular speed ratio, the number of poles of said motor being less than the number of poles of said synchronous machine divided by the predetermined angular speed ratio, means including a switch for connecting the winding of said motor in series with the winding of said machine between the terminals of said source, and a second switch for deënergizing the winding of said motor.

5. The combination of an alternating current synchronous machine and means for driving said synchronous machine up to synchronous speed and for automatically energizing the same at substantially full line voltage, said means comprising an asynchronous alternating motor, and means for connecting the winding of said synchronous machine in series with the winding of said motor.

6. The combination with an alternating current synchronous machine having a predetermined number of poles, of means for starting said synchronous machine from rest and for automatically causing the same to operate under normal synchronous conditions, said means comprising an induction motor, the movable element of which is mechanically connected to the movable element of said machine to drive the same at a certain angular speed ratio, the number of poles of said induction motor being less than the number of poles of said synchronous machine divided by the angular speed ratio.

In testimony whereof I affix my signature in presence of two witnesses.

JAMES BURKE.

Witnesses:
  L. K. SAGER,
  GEO. A. HOFFMAN.